United States Patent [19]

Markusch et al.

[11] 4,413,111
[45] Nov. 1, 1983

[54] ISOCYANATE-TERMINATED PREPOLYMERS WITH LOW FREE MONOMER CONTENTS

[75] Inventors: Peter H. Markusch, McMurray, Pa.; Terry A. Potter, New Martinsville, W. Va.

[73] Assignee: Mobay Chemical Corporation, Pittsburgh, Pa.

[21] Appl. No.: 426,301

[22] Filed: Sep. 29, 1982

[51] Int. Cl.$^3$ .............................................. C08G 18/10
[52] U.S. Cl. .......................................... 528/59; 528/60; 528/65; 528/75; 528/76; 528/80; 528/83; 528/85
[58] Field of Search ........................ 528/59, 60, 65, 75, 528/76, 80, 83, 85

[56] References Cited

U.S. PATENT DOCUMENTS

| | | | |
|---|---|---|---|
| 4,184,005 | 1/1980 | Bauriedel et al. | 428/420 |
| 4,195,009 | 3/1980 | Zimmermann | 260/31.2 N |
| 4,211,804 | 7/1980 | Brizzolara | 427/377 |
| 4,247,675 | 1/1981 | Fukuda et al. | 528/44 |
| 4,254,168 | 3/1981 | Monson | 427/409 |
| 4,273,912 | 6/1981 | Harmer | 528/67 |
| 4,282,123 | 8/1981 | Ilaria | 260/18 PT |
| 4,292,350 | 9/1981 | Kubitza et al. | 427/385.5 |

*Primary Examiner*—Maurice J. Welsh
*Attorney, Agent, or Firm*—Gene Harsh; Lawrence S. Pope; Thomas W. Roy

[57] ABSTRACT

The present invention is directed to a process for the preparation of an isocyanate-terminated prepolymer having a content of unreacted diisocyanate of less than about 2% by weight, preferably less than about 1% by weight, based on the weight of the isocyanate-terminated prepolymer, and containing internal urethane groups based on 4,4'-diisocyanato-dicyclohexyl-methane by (a) preparing an OH-terminated prepolymer from
  (i) a high molecular weight polyol component, and-/or
  (ii) a low molecular weight isocyanate-reactive component, and
  (iii) a polyisocyanate component comprising 4,4'-diisocyanato-dicyclohexyl-methane
  at an NCO/OH equivalent ratio of about 0.5:1 to 0.9:1;

(b) forming the isocyanate-terminated prepolymer by reacting the OH-terminated prepolymer with a polyisocyanate other than 4,4'-diisocyanato-dicyclohexyl-methane containing aromatically-, aliphatically- and-/or cycloaliphatically-bound isocyanate groups at an NCO:OH equivalent ratio, based on the free -OH groups of component (a), of about 1.6:1 to 15:1, and (c) reducing the amount of unreacted diisocyanate to less than about 2% by weight, based on the weight of the isocyanate-terminated prepolymer.

The present invention is also directed to the products prepared by this process and their use in one-component, moisture-cure systems or as the isocyanate component in two-component polyurethanes.

14 Claims, No Drawings

ISOCYANATE-TERMINATED PREPOLYMERS WITH LOW FREE MONOMER CONTENTS

BACKGROUND OF THE INVENTION

1. Field of the Invention

The present invention is directed to a process for preparing isocyanate-terminated prepolymers from OH-terminated prepolymers based on 4,4'-diisocyanatodicyclohexyl-methane, the products produced therefrom and their use in one-component, moisture-cure systems or as the isocyanate component in two-component polyurethanes.

2. Description of the Prior Art

The use of isocyanate-terminated prepolymers as one-component, moisture-cure polyurethanes or as the isocyanate-component in two-component polyurethanes is known as disclosed by U.S. Pat. Nos. 4,211,804, 4,273,912, 4,247,675, 4,292,350, 4,254,168, 4,282,123, 4,195,009 and 4,184,005. In the production of light stable and flexible polyurethane coatings, it is also known that the use of isocyanate-terminated prepolymers prepared from an isocyanate component based exclusively on 4,4'-diisocyanato-dicyclohexyl-methane provide enhanced flexibility, high abrasion resistance and good hydrolytic stability. However, when these isocyanate-terminated prepolymers are produced using normal preparation procedures, they suffer from the disadvantage of containing high amounts of unreacted diisocyanate (free monomer). These contents are normally greater than 2% by weight and sometimes exceed 10% by weight. Due to the high free monomer content of these prepolymers, they may create certain handling and application problems (e.g. in spray applications).

Accordingly, it is an object of the present invention to provide isocyanate-terminated prepolymers containing urethane groups based on 4,4'-diisocyanato-dicyclohexyl-methane and which contain less than about 2% by weight of unreacted diisocyanates.

It is a further object of the present invention to provide isocyanate-terminated prepolymers containing urethane groups based on 4,4'-diisocyanato-dicyclohexyl-methane which are suitable and safer to handle in various application areas, e.g. for spray applications, when used in one-component, moisture-cure systems or as the isocyanate component in two-component polyurethane systems.

It is an additional object of the present invention to use isocyanate-terminated prepolymers containing urethane groups based on 4,4'-diisocyanato-dicyclohexyl-methane to prepare polyaddition products which possess enhanced flexibility, high abrasion resistance and good hydrolytic stability.

SUMMARY OF THE INVENTION

The present invention is directed to a process for the preparation of an isocyanate-terminated prepolymer having a content of unreacted diisocyanate of less than about 2% by weight, preferably less than about 1% by weight, based on the weight of said isocyanate-terminated prepolymer, and containing internal urethane groups based on 4,4'-diisocyanato-dicyclohexyl-methane which comprises
  (a) preparing an OH-terminated prepolymer from
    (i) a high molecular weight polyol component, and/or
    (ii) a low molecular weight isocyanate-reactive component, and
    (iii) a polyisocyanate component comprising 4,4'-diisocyanate-dicyclohexylmethane
  at an NCO/OH equivalent ratio of about 0.5:1 to 0.9:1;
  (b) forming said isocyanate-terminated prepolymer by reacting said OH-terminated prepolymer with a polyisocyanate other than 4,4'-diisocyanato-dicyclohexyl-methane containing aromatically-, aliphatically- and/or cycloaliphatically-bound isocyanate groups at an NCO:OH equivalent ratio, based on the free -OH groups of component (a), of about 1.6:1 to 15:1; and
  (c) reducing the amount of unreacted diisocyanate to less than about 2% by weight, based on the weight of said isocyanate-terminated prepolymer.

The present invention is also directed to the products prepared by this process and their use in one-component, moisture-cure systems or as the isocyanate component in two-component polyurethanes.

DETAILED DESCRIPTION OF THE INVENTION

The high molecular weight polyol component used in the preparation of the OH-terminated prepolymers are those having a molecular weight from about 400 to 10,000, preferably from about 700 to 8,000 and having an average hydroxyl functionality of about 2 to 8, preferably about 2 to 4 and most preferably about 2. The high molecular weight polyol component includes those based on polyesters, polyethers, polythioethers, polyacetals, polycarbonates and polyacrylates.

High molecular weight polyester polyols which are suitable include, e.g. reaction products of polyhydric, preferably dihydric alcohols to which trihydric alcohols may be added and polybasic, preferably dibasic carboxylic acids. Instead of free polycarboxylic acids, the corresponding polycarboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid, adipic acid, suberic acid; azelaic acid; sebacic acid, phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid; which may be mixed with monomeric fatty acids; dimethyl terephthalate and bisglycolterephthalate. Suitable polyhydric alcohols include, e.g. ethylene glycol; propylene glycol-(1,2) and -(1,3); butylene glycol-(1,4) and -(1,3); hexanediol-(1,6); octanediol-(1,8); neopentyl glycol; cyclohexanedimethanol-(1,4-bis-hydroxymethylcyclohexane); 2-methyl-1,3-propanediol; glycerol; trimethylolpropane; hexanetriol-(1,2,6); butanetriol-(1,2,4); trimethylolethane; triethylene glycol; tetraethylene glycol; polyethylene glycol; dipropylene glycol; polypropylene glycol; dibutylene glycol and polybutylene glycol. The polyesters may also contain a proportion of carboxyl end groups. Polyesters of lactones, e.g. ε-caprolactam, or hydroxycarboxylic acids, e.g. ω-hydroxycaproic acid, may also be used.

The higher molecular weight polyethers which are preferably used according to the invention are obtained in known manner by reaction of the starting compounds which contain reactive hydrogen atoms with alkylene oxides such as ethylene oxide; propylene oxide; butylene oxide; styrene oxide; tetrahydrofuran or epichlorohydrin or with any mixtures of these alkylene oxides. In many cases, it is preferred to use polyethers which contain predominantly primary hydroxyl groups.

Suitable starting compounds containing reactive hydrogen atoms include, e.g. water; methanol; ethanol; ethylene glycol; propylene glycol-(1,2) or -(1,3); butylene glycol-(1,4) or -(1,3); hexanediol-(1,6); octanediol-(1,8); neopentyl glycol; 1,4-bishydroxymethylcyclohexane; 2-methyl-1,3-propanediol; glycerol; trimethylolpropane; hexanetriol-(1,2,6); butanetriol-(1,2,4); trimethylolethane; pentaerythritol; mannitol; sorbitol; methyl glycoside; sucrose; phenol; isononylphenol; resorcinol; hydroquinone; 1,2,2- or 1,1,3-tris-(hydroxyphenyl)-ethane; ammonia; methylamine; ethylene diamine; tetra- or hexamethylene diamine; diethylenetriamine; ethanolamine; diethanolamine; triethanolamine; aniline; phenylenediamine; 2,4- and 2,6-diaminotoluene and polyphenylpolymethylene polyamines of the kind obtained by aniline-formaldehyde condensation. Resinous materials such as phenol and resol resins may also be used as the starting materials.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Pat. No. 1,152,536).

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythio-mixed ethers, polythioether esters or polythioether ester amides, depending on the co-components.

Suitable polyacetals include the compounds which can be prepared from glycols such as diethylene glycol; triethylene glycol; 4,4'-dioxethoxy-diphenyldimethylene; hexanedediol and formaldehyde. Polyacetals suitable for the purpose of the invention may also be prepared by the polymerization of cyclic acetals.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with diarylcarbonates, e.g. diphenylcarbonate, or phosgene.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate, and 2-isocyanatoethyl methacrylate.

The preferred high molecular weight polyol components are the polyether, polyester and polycarbonate polyols.

The OH-terminated prepolymers may also be prepared with a low molecular weight isocyanate-reactive component having an average molecular weight of about 62 to 400. The low molecular weight isocyanate-reactive component may contain a single compound or a mixture of compounds, but should have an average functionality of about 2 to 8, preferably from about 2 to 6 and most preferably from about 2 to 4, and may also contain ether, thioether or ester bonds.

Suitable examples of low molecular weight compounds include monohydric alcohols such as butanol, 2-ethylhexanol, amyl alcohol and ethylene glycol monoethyl ether as well as the diols or triols used as chain lengthening agents or cross-linking agents in polyurethane chemistry, e.g. propylene glycol-(1,2) and -(1,3), butylene glycol-(1,4) and -(2,3); hexanediol(1,6); octane diol-(1,8); neopentyl glycol, cyclohexane dimethanol-(1,4-bis-hydroxymethylcyclohexane); 2-methyl-1,3-propanediol; glycerol; trimethylolpropane; hexane triol-(1,2,6); butanetriol-(1,2,4) or trimethylolethane, and also glycols such as ethylene glycol, diethyleneglycol, triethylene glycol, tetraethylene glycol and polyethylene glycols having a molecular weight of up to 400. In addition compounds such as dipropylene glycol, polypropylene glycols having a molecular weight of up to 400, dibutylene glycol, polybutylene glycols having a molecular weight of up to 400, thiodiglycol and castor oil may also be used according to the invention. Also suitable are ester diols of the general formula

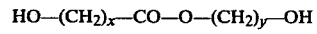

$$HO-(CH_2)_x-CO-O-(CH_2)_y-OH$$

and

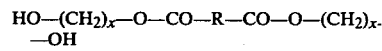

$$HO-(CH_2)_x-O-CO-R-CO-O-(CH_2)_x-OH$$

in which
R represents an alkylene or arylene group having from 1 to 10, preferably 2 to 6 carbon atoms,
x = 2 to 6 and
y = 3 to 5,
e.g. δ-hydroxybutyl-ε-hydroxycaproic acid ester; ω-hydroxyhexyl-δ-hydroxybutyric acid ester; adipic acid-bis-(δ-hydroxyethyl)-ester and terephthalic acid-bis-(β-hydroxyethyl)-ester; as well as diol urethanes of the general formula

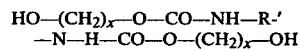

$$HO-(CH_2)_x-O-CO-NH-R'-N-H-CO-O-(CH_2)_x-OH$$

in which
R' represents an alkylene, cycloalkylene or arylene group having from 2 to 15 carbons, preferably 4,4'dicyclohexyl-methane and
x represents an integer of from 2 to 6,
e.g. 4,4'-dicyclohexyl-methane-bis-(β-hydroxyethylurethane) or 4,4'-dicyclohexyl-methane-bis-(δ-hydroxybutylurethane).

Also suitable are diol ureas of the general formula

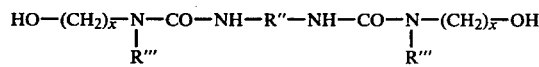

$$HO-(CH_2)_x-N(R''')-CO-NH-R''-NH-CO-N(R''')-(CH_2)_x-OH$$

in which
R" represents an alkylene, cycloalkylene or arylene group having from 2 to 15 carbons and preferably dicyclohexyl-methane,
R''' represents hydrogen or a methyl group and
x = 2 or 3,
e.g. 4,4'-dicyclohexyl-methane-bis-(β-hydroxyethylurea).

Also suitable as low molecular weight isocyanate-reactive components are the amino alcohols, especially those defined according to the following formula,

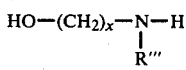

wherein
R''' represents hydrogen or a methyl group, and x=2 or 3.

In addition, minor amounts of the polyamines, preferably diamines, known in polyurethane chemistry may be used provided that amounts are used which statistically provide for OH-terminated prepolymers, i.e. by controlling the hydroxy/amino group ratio and the NCO-/OH ratio.

The use of diol urethanes or diol ureas is not preferred unless they are based upon 4,4'-diisocyanato-dicyclohexyl-methane since the use of other diisocyanates to prepare these compounds obviously reduces the amount of 4,4'-diisocyanato-dicyclohexyl-methane which can be incorporated into the OH-terminated prepolymer. Thus, while minor amounts of other polyisocyanates may be used in the preparation of the OH-terminated prepolymers such as by the formation of diol urethanes or diol ureas, their use is not preferred.

Particularly suitable among the dihydric and trihydric low molecular weight alcohols are those which, either alone or as mixtures or with the addition of higher molecular weight alcohols, are liquid at temperatures below 50° C.

The OH-terminated prepolymers may be prepared by the methods generally known in polyurethane chemistry. For example, the high molecular weight polyol component and optionally the low molecular weight isocyanate-reactive component may be added to a reaction vessel and optionally treated at elevated temperature under reduced pressure to remove the water contained in the components. After removal of the water the polyisocyanate component, 4,4'-diisocyanato-dicyclohexyl-methane, is added to the polyol component and the reaction is carried out at a temperature of about 20° to 150° C., preferably about 60° to 120° C., generally until no isocyanate groups can be detected.

The equivalent ratio of NCO groups in the polyisocyanate component to —OH groups in both the high molecular weight polyol component and low molecular weight isocyanate-reactive component should be about 0.5:1 to 0.9:1, preferably about 0.6:1 to 0.9:1. The equivalent ratio between the high molecular weight polyol component and the low molecular weight isocyanate-reactive component as well as the overall NCO:OH equivalent ratio should be chosen so that the average molecular weight of the OH-terminated prepolymer is between about 380 and 10,000, preferably between about 700 and 8,000 and most preferably between about 1,000 and 5,000.

When polyamines or amino alcohols are used as a portion of the low molecular weight isocyanate-reactive component, the amino groups are treated as hydroxyl groups for determining the NCO/OH equivalent ratio.

In addition to 4,4'-diisocyanato-dicyclohexyl-methane, minor amounts of other polyisocyanates (up to about 25 mole percent) may be used. Suitable polyisocyanates are those set forth hereinafter with regard to the preparation of the isocyanate-terminated prepolymers. However, the use of other polyisocyanates is not preferred since it reduces the amount of 4,4'-diisocyanato-dicyclohexyl-methane which may be incorporated into the prepolymers.

The preparation of the OH-terminated prepolymers may be carried out in the presence of organic solvents which are commonly used in polyurethane coating compositions and include esters, ketones, halogenated hydrocarbons, alkanes, alkenes and arenes. Examples of these solvents are methylene chloride, trichloroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, diisobutyl ketone, dioxane, ethyl acetate, ethyl n-amyl ketone, ethyl n-butyl ketone, ethylene dichloride, ethylene glycol monobutyl ether acetate, ethylene glycol monoethyl ether acetate, ethylene glycol monomethyl ether acetate, 2-ethylhexyl acetate, glycol diacetate, heptane, hexane, isobutyl acetate, isobutyl isobutyrate, isooctane, isopropyl acetate, methyl acetate, methyl chloroform, methyl chloride, methyl ethyl ketone, methyl n-heptyl ketone, methyl isoamyl ketone, methyl n-propyl ketone, mineral spirits, monochlorobenzene, 2-nitropropane, orthene, orthodichlorobenzene, perchloroethylene, n-propyl acetate, tetrahydrofuran, tetrachloroethylene, 1,1,1-trichloroethane, trichlorofluoromethane and mixtures of these solvents.

The preferred solvents are toluene, xylene, butyl acetate, methyl isobutyl ketone, ethyl acetate, ethylene glycol monobutyl ether acetate, ethylene glycol monoethyl ether acetate, ethylene glycol monomethyl ether acetate, isobutyl isobutyrate, methyl ethyl ketone and mineral spirits.

The amount of solvent may vary within wide limits, but is generally maintained below about 80% by weight, preferably below about 50% by weight, based on the weight of the OH-terminated prepolymers.

After the OH-terminated prepolymer has been formed, it is capped or converted into an isocyanate-terminated prepolymer by an additional reaction with a polyisocyanate, i.e. a compound containing 2 to 4 isocyanate groups, preferably 2 isocyanate groups. In order to avoid the potentially physiologically harmful effects associated with prepolymers based exclusively on 4,4'-diisocyanto-dicyclohexyl-methane, the polyisocyanates should either have (1) sufficiently high vapor pressures to ensure their removal from the prepolymers by conventional distillation techniques, (2) an isocyanate group which is more reactive than the remaining isocyanate group(s) or (3) a sufficiently low vapor pressure so that they do not need to be removed from the prepolymers. Suitable polyisocyanates of this type include aliphatic, cycloaliphatic, araliphatic, aromatic and heterocyclic polyisocyanates such as those described, for example, by W. Siefken in Justus Liebigs Annalen der Chemie, 562, pages 75 to 136, for example, ethylene diisocyanates; 1,4-tetramethylene diisocyanate; 1,6-hexamethylene diisocyanate; cyclobutane-1,3-diiso cyanate; cyclohexane-1,3 and 1,4-diisocyanate and any mixtures of these isomers; 1-isocyanato-3,3,5-trimethyl-5-isocyanatomethylcyclohexane as described in German Auslegeschrift No. 1,202,785 and U.S. Pat. No. 3,401,190; 2,4- and 2,6-hexahydrotolylene diisocyanate and any mixtures of these isomers; hexahydro-1,3 and-/or 1,4-phenylene diisocyanate; 1,3- and 1,4-phenylene diisocyanate; 2,4- and 2,6-tolylene diisocyanate and any mixtures of these isomers; diphenylmethane-2,4'-diisocyanate; diisocyanates of the kind described in U.S.

Pat. No. 3,492,330, polyisocyanates having allophanate groups as described, e.g. in British Pat. No. 994,890; Belgian Pat. No. 761,626 and published Dutch Patent Application No. 7,102,524; polyisocyanates having isocyanurate groups as described, e.g. in U.S. Pat. No. 3,001,973; German Pat. Nos. 1,022,789; 1,222,067 and 1,027,394 and in German Offenlegungsschriften Nos. 1,929,034 and 2,004,048; polyisocyanates with urethane groups, e.g. as described in Belgian Pat. No. 752,261 and U.S. Pat. No. 3,394,164; polyisocyanates having acylated urea groups according to German Pat. No. 1,230,778; polyisocyanates with biuret groups as described, e.g. in German Pat. No. 1,101,394; U.S. Pat. Nos. 3,124,605 and 3,201,372 and British Pat. No. 889,050; polyisocyanates with ester groups, for example, those mentioned in British Pat. Nos. 965,474 and 1,072,956; U.S. Pat. No. 3,567,763 and German Pat. 1,231,688; and polyisocyanates containing polymeric fatty acid groups according to U.S. Pat. No. 3,455,883.

The equivalent ratio of isocyanate groups in the polyisocyanate component to the terminal OH groups of the OH-terminated prepolymer is generally between about 1.6:1 to 15:1, preferably about 2:1 to 10:1. When using polyisocyanates wherein the reactivity of the isocyanate groups is essentially equal, it is preferred to use an excess of the polyisocyanate in order to ensure capping of the OH-terminated prepolymers without an undue amount of chain extension. The amount of the excess depends upon the type of polyisocyanate used for capping. When using diisocyanates, especially those having high vapor pressures, NCO:OH equivalent ratios of up to about 15:1, preferably up to about 10:1, may be employed. The unreacted diisocyanates which are not bound to the OH-terminated prepolymer through a urethane linkage may be removed in a conventional distillation apparatus, for example, in a thin layer evaporator, preferably in an agitated thin film evaporator. When using polyisocyanates having an average functionality of about 3 to 4, it is preferred to provide 1.5 to 2 moles of the polyisocyanate per equivalent of terminal OH-groups. In addition, due to their lower vapor pressure, these polyisocyanates do not have to be removed by distillation.

When using polyisocyanates wherein the reactivity of the isocyanate groups is essentially equal, it is possible, though not preferred, to use a stoichiometric amount of the polyisocyanate, i.e. to provide one mole of polyisocyanate for each mole of terminal OH-groups of the OH-terminated prepolymer. However, because of the similar reactivities of the isocyanate groups, some chain extension will occur resulting in the presence of free polyisocyanates which may have to be removed by distillation in the same manner as when an excess of polyisocyanates containing isocyanate groups of essentially equal reactivity are used to cap the OH-terminated prepolymers. The chain extension which does occur when using a stoichiometric amount of these polyisocyanates may also unduly increase the molecular weight of the isocyanate-terminated prepolymers. In addition, any increase in molecular weight caused by chain extension in the capping operation could have been achieved by using additional 4,4'-diisocyanato-dicyclohexyl-methane during the formation of the OH-terminated prepolymer followed by capping without undue amounts of chain extension. Thus, in effect, any chain extension which occurs during the capping operation results in a reduction of the amount of 4,4'-diisocyanatodicyclohexyl-methane which could have been incorporated in an isocyanate-terminated prepolymer of similar molecular weight.

When capping the OH-terminated prepolymer with a polyisocyanate wherein one of the isocyanate groups is more reactive then the remaining isocyanate group(s), (e.g. isophorone diisocyanate), it is preferred to provide one mole of polyisocyanate for each equivalent of terminal OH-groups of the prepolymer. For example, when a diisocyanate is used for capping the OH-terminated prepolymer, the preferred NCO/OH equivalent ratio would be about 2:1, whereas when a triisocyanate is used, the preferred NCO/OH equivalent ratio would be about 3:1. Due to the differential reactivity between the isocyanate groups of the polyisocyanate very little chain extension occurs, thus ensuring a low free polyisocyanate content and obviating the need for a subsequent distillation step to reduce the amount of free polyisocyanate. However, even when one of the isocyanate groups of the polyisocyanate is more reactive than the remaining isocyanate group(s), it is possible, though not preferred, to use an excess of the polyisocyanate to cap the OH-terminated prepolymer and to subsequently remove the free polyisocyanate by distillation.

The conditions used for converting the OH-terminated prepolymers into an isocyanate-terminated prepolymer are essentially the same as those used for the preparation of the OH-terminated prepolymer. As the reaction proceeds the amount of unreacted isocyanate groups decreases due to their reaction with the terminal OH-groups. Thus, the reaction is terminated when the theoretical NCO content is achieved or slightly surpassed.

The average molecular weight of the isocyanate-terminated prepolymers should be maintained between about 600 and 11,000, preferably between about 900 and 8,500 and most preferably between about 1,200 and 6,500. The prepolymers should contain from about 33 to 85 mole percent, preferably about 50 to 80 mole percent, of 4,4'-diisocyanato-dicyclohexylmethane based on the total number of moles of polyisocyanate contained in the isocyanate-terminated prepolymer.

The isocyanate-terminated prepolymers of the present invention are useful in the application areas where prepolymers based on 4,4'-diisocyanato-dicyclohexylmethane have previously been used, especially as the isocyanate component in two-component polyurethane systems or in one-component, moisture-cure systems. However, due to their low free monomer content these prepolymers are specially suited for spray applications. The prepolymers can also be mixed with conventional additives such as pigments, flow agents, catalysts, stabilizers, etc. The prepolymers are useful in various systems as coatings, laminants, adhesives, flocculants and elastomers.

When used in one-component, moisture-cure systems they are suitable for decorative coatings such as flooring material and in particular, elastomeric-textured flooring material. In addition, they are especially suited for coating roofing materials and may be used as a protective coating on textured sheet materials, on the backside of coated abrasive flaps of an abrasive flap wheel, on bright metal surfaces such as a nickel surface, on polymeric films such as polyamide films, on polystyrene substrates, on the interior or exterior surface of metal containers, on unpainted surfaces and on stained or unstained wood; for coatings on metals, wood, plastics, concrete, paper or asbestos cement; and for coatings in the foodstuff industry. These coatings may be applied to the various substrates by conventional methods such as spread coating, spraying or application with rollers.

When used in two-component systems the prepolymers are combined with an isocyanate-reactive component, in particular the known polyols of polyurethane chemistry such as polyethers, polyesters and polycarbonates. The two-component systems are useful as adhesives, laminates, coatings, etc. and are especially suited for coating ferrous and nonferrous metals, plastics, rubber, leather and concrete. Thus, they have a wide range of applications in such fields as the manufacture of building materials, automobiles, machines and instruments, woodworks, aircraft, railroad carriages, ships, and shatter-proof glass bottles. The coatings are particularly useful for coating roofing materials and floors and also coating surfaces which are subjected to severe abrasion conditions by the cargo carried (coal, gravel, sand, dolomite, etc.) as well as corrosives such as those generated by wet coal, phosphate rock and the like.

The two-component systems may also be used as chip-resistant coatings, e.g. on automobile bodies immediately behind the wheels or on the leading portion of automobiles such as the front of the hood and other front portions and also as coatings for the plastic parts of automobiles. These systems may be blended with pigmented acrylic lacquers, acrylic enamels or nitrocellulose lacquers to provide a coating composition which matches the colors of the existing pigmented protective surface of a substrate such as an automobile body.

While separate uses have been described for the one-component and two-component systems, it is to be understood that most of these uses are interchangeable, i.e. they may be conducted with either one-component or two-component systems.

The invention is further illustrated, but is not intended to be limited by the following examples in which all parts and percentages are by weight unless otherwise specified.

EXAMPLES

EXAMPLE 1

Preparation of an OH-terminated prepolymer 510 parts of a polyester polyol prepared from 1,6-hexanediol, neopentyl glycol and adipic acid (MW 1700, glycol ratio-65:35 mol %), 12 parts trimethylolpropane and 85.5 parts 4,4'-diisocyanato-dicyclohexyl-methane were reacted at 90°–95° C. for 3 hours to produce an OH-terminated prepolymer.
 NCO/OH equivalent ratio—0.75:1
 equivalent weight—2790
 OH # (theoretical)—20.1
 OH # (found)—20.05

EXAMPLE 2

Preparation of an isocyanate-terminated prepolymer according to the present invention 234.1 parts of the OH-terminated prepolymer from Example 1 were reacted with 18.8 parts of isophorone diisocyanate (NCO/OH equivalent ratio-2.02:1) for 9 hours at 60° C. until an NCO content of 1.07 was obtained. The isocyanate-terminated prepolymer was then diluted to 60% solids by adding 168.6 parts of a 1:1 solvent blend of ethylene glycol monoethyl ether acetate and xylene. A catalyst, dibutyl tin dilaurate, was then added (0.5% based on solids) and the reaction mixture was stirred at room temperature until the NCO content was below theoretical value of 0.85% (60% solids). The reaction was terminated at an NCO content of 0.66% and the product was diluted to 50% solids by adding 82.5 parts of a 1:1 solvent blend of ethylene glycol monoethyl ether acetate and xylene.
 Viscosity—1660 cps at 25° C.

EXAMPLE 3

Preparation of an isocyanate-terminated prepolymer according to the present invention 373.4 parts of the OH-terminated prepolymer from Example 1 were reacted with 112.6 parts of hexamethylene diisocyanate (NCO/OH equivalent ratio—10:1) at 60° C. until the NCO content was below the theoretical value of 10.43%. The reaction was terminated by cooling to room temperature at an NCO content of 10.20%. The isocyanate-terminated prepolymer was diluted to 90% solids with 54 parts of ethylene glycol monoethyl ether acetate and treated by thin-layer evaporation to remove excess hexamethylene diisocyanate. 247.7 parts of the isocyanate-terminated prepolymer were recovered and diluted to 50% solids by adding 247.6 parts of a 1:1 solvent blend of ethylene glycol monoethyl ether acetate (123.9 parts) and xylene (123.7 parts).
 Viscosity—470 cps at 25° C.
 Measured NCO content—0.55%
 Theoretical NCO content—0.58%
 % free hexamethylene diisocyanate monomer—<0.2% (based on solids)

EXAMPLE 4 (COMPARISON)

Preparation of an isocyanate-terminated prepolymer not according to the present invention An isocyanate-terminated prepolymer was prepared by charging 198 parts of 4,4'-diisocyanato-dicyclohexyl-methane along with 115 parts by xylene and 115 parts of ethylene glycol monoethyl ether acetate followed by the following polyol blend:
 200 parts of a hexane diol polycarbonate (MW 2000)
 50 parts of hydroxymethyloctadecanol* (MW 302)
 10 parts of trimethylolpropane.
*Henkel C-19 Diol The reaction was continued until an NCO content of 4.57% was obtained which was slightly below the theoretical NCO content of 4.6%.
 NCO/OH equivalent ratio—2:1
 viscosity—~2000 cps
 % free 4,4'-diisocyanate-dicyclohexyl-methane monomer—8.1% (based on solids)

EXAMPLE 5

Preparation of an isocyanate-terminated prepolymer according to the present invention An OH-terminated prepolymer was prepared by charging the following polyol blend into a reaction vessel at 70° C.:
 200 parts of a hexanediol polycarbonate (MW 2000)
 50 parts of hydroxymethyloctadecanol (MW 302)
 10 parts of trimethylolpropane.
After the addition of the polyols, 93 parts of xylene and 93 parts of ethylene glycol monoethyl ether acetate were added followed by 84.2 parts of 4,4'-diisocyanatodicyclohexyl-methane (NCO/OH equivalent ratio—0.85:1). The reaction vessel was maintained at 95° C. for about four hours until the NCO content was essentially zero. The OH-terminated prepolymer was then reacted with 25.1 parts isophorone diisocyanate (NCO/OH equivalent ratio—2:1) at 100° C. until the NCO content was below theoretical and subsequently cooled to room temperature with stirring. The isocyanate-terminated prepolymer was analyzed for free monomer content and found to contain 0.6% isophorone diisocyanate and less than 0.2% 4,4'-diisocyanato-dicyclohexyl-methane (based on solids). The viscosity was ~22,000 cps at 25° C.

EXAMPLE 6

Preparation of an isocyanate-terminated prepolymer according to the present invention An OH-terminated prepolymer was prepared by charging the following polyol blend into a reaction vessel at 60° C. along with 60 parts xylene and 60 parts ethylene glycol monoethyl ether acetate:
500 parts of the hexane diol polycarbonate used in Example 5,
200 parts of the hydroxymethyloctadecanol used in Example 5,
20 parts of trimethylolpropane.
253.3 parts of 4,4'-diisocyanate-dicyclohexyl-methane (NCO/OH equivalent ratio—0.85:1) were added and the reaction temperature was raised to 85° C. The reaction was continued for about 2.5 hours until the NCO was essentially zero. An additional 162 parts of xylene and 162 parts of ethylene glycol monoethyl ether acetate were added and then the OH-terminated prepolymer was reacted with 75.8 parts of isophorone diisocyanate (NCO/OH equivalent ratio—2:1) at 75° C. for about 5 hours until a constant NCO content was obtained. 300 parts of xylene and 300 parts of ethylene glycol monoethyl ether acetate were added to adjust the solids content to 50%. The isocyanate-terminated prepolymer was analyzed for free monomer content and found to contain 0.4% isophorone diisocyanate and less than 0.2% 4,4'-diisocyanate-dicyclohexyl-methane (based on solids).

EXAMPLE 7

Preparation of an isocyanate-terminated prepolymer according to the present invention An OH-terminated prepolymer was prepared by charging the following polyol blend into a reaction vessel at 55° C.;
310.9 parts of the hexane diol polycarbonate used in Example 5
72.5 parts of the hydroxymethyloctadecanol used in Example 5
11.5 parts of trimethylolpropane
16.1 parts of hexane diol
After the addition of the polyols, 316.2 parts of xylene and 316.2 parts of ethylene glycol monoethyl ether acetate were added followed by 104 parts of 4,4'-diisocyanate-dicyclohexyl-methane (NCO:OH equivalent ratio—0.6:1). The temperature was gradually increased to 85° C. over a period of 1 hour and maintained at 85° C. for 3 hours. The temperature was then raised to 95° C. for about 1 hour to ensure that an NCO content of essentially zero was obtained. The reaction mixture was cooled to 70° C. and 109.8 parts of isophorone diisocyanate were added (NCO/OH equivalent ratio—1.87:1). The temperature was gradually increased to 85° C. over a period of 1 hour and maintained at this temperature for 3 hours. The temperature was then raised to 95° C. until the NCO content (1.42%) was below the theoretical value (1.54%). The isocyanate-terminated prepolymer was analyzed for monomer content and found to contain 1.2% isophorone diisocyanate and 0.2% 4,4'-diisocyanato-dicyclohexyl-methane (based on solids).

Although the invention has been described in detail in the foregoing for the purpose of the illustration, it is to be understood that such detail is solely for that purpose and that variations can be made therein by those skilled in the art without departing from the spirit and scope of the invention except as it may be limited by the claims.

What is claimed is:

1. A process for the preparation of an isocyanate-terminated prepolymer having a content of unreacted diisocyanate of less than 2% by weight, based on the weight of said isocyanate-terminated prepolymer, and containing internal urethane groups based on 4,4'-diisocyanato-dicyclohexyl-methane which comprises
   (a) preparing an OH-terminated prepolymer from
      (i) a high molecular weight polyol component, and/or
      (ii) a low molecular weight isocyanate-reactive component, and
      (iii) a polyisocyanate component comprising 4,4'-diisocyanate-dicyclohexyl-methane
   at an NCO/OH equivalent ratio of about 0.5:1 to 0.9:1;
   (b) forming said isocyanate-terminated prepolymer by reacting said OH-terminated prepolymer with a polyisocyanate other than 4,4'-diisocyanato-dicyclohexyl-methane containing aromatically-, aliphatically- and/or cycloaliphatically-bound isocyanate groups at an NCO:OH equivalent ratio, based on the free —OH groups of component (a), of about 1.6:1 to 15:1; and
   (c) reducing the amount of unreacted diisocyanate to less than about 2% by weight, based on the weight of said isocyanate-terminated prepolymer.

2. The process of claim 1 wherein said high molecular weight polyol component has an average hydroxyl functionality of about 2 to 4.

3. The process of claim 1 wherein said low molecular weight isocyanate-reactive component has an average functionality of about 2 to 4.

4. The process of claim 1 wherein component (b) comprises a member selected from the group consisting of isophorone diisocyanate, 1,6-hexamethylene diisocyanate, biuret group-containing polyisocyanates based on 1,6-hexamethylene diisocyanate and isocyanurate group-containing polyisocyanates based on 1,6-hexamethylene diisocyanate.

5. The process of claim 1 wherein said OH-terminated prepolymer has an average molecular weight based about 380 and 10,000.

6. The process of claim 1 wherein said isocyanate-terminated prepolymer has an average molecular weight between about 600 and 11,000.

7. The process of claim 1 wherein said isocyanate-terminated prepolymer contains about 33 to 85 mole percent of 4,4'-diisocyanate-dicyclohexyl-methane based on the total number of moles of polyisocyanate contained in said isocyanate-terminated prepolymer.

8. A process for the preparation of an isocyanate-terminated prepolymer having an average molecular weight of between about 600 and 11,000 and a content of unreacted diisocyanate of less than about 2% by weight, based on the weight of said isocyanate-terminated prepolymer, and containing internal urethane groups based on 4,4′-diisocyanato-dicyclohexyl-methane which comprises (a) preparing an OH-terminated prepolymer having an average molecular weight between about 380 and 10,000 from
  (i) a high molecular weight polyol component having an average hydroxyl functionality of about 2 to 4, and/or
  (ii) a low molecular weight isocyanate-reactive component having an average functionality of about 2 to 4, and
  (iii) a polyisocyanate component comprising 4,4′-diisocyanato-dicyclohexyl-methane
  at an NCO/OH equivalent ratio of about 0.5:1 to 0.9:1;

(b) forming said isocyanate-terminated prepolymer by reacting said OH-terminated prepolymer with a polyisocyanate containing aromatically-, aliphatically- and/or cycloaliphatically-bound isocyanate groups at an NCO:OH equivalent ratio, based on the free —OH groups of component (a), of about 1.6:1 to 15:1; and (c) reducing the amount of unreacted diisocyanate to less than about 2% by weight, based on the weight of said isocyanate-terminated prepolymer.

9. The process of claim 8 wherein said isocyanate-terminated prepolymer contains about 33 to 85 mole percent of 4,4′-diisocyanato-dicyclohexyl-methane based on the total number of moles of polyisocyanate contained in said isocyanate-terminated prepolymer.

10. The process of claim 9 wherein component (b) comprises a member selected from the group consisting of isophorone diisocyanate, 1,6-hexamethylene diisocyanate, biuret group-containing polyisocyanates based on 1,6-hexamethylene diisocyanate and isocyanurate group-containing polyisocyanates based on 1,6-hexamethylene diisocyanate.

11. The product produced in accordance with claim 1, 8 or 9.

12. A one-component, moisture-cure system comprising the product of claim 11.

13. A two-component polyurethane composition which comprises
  (a) the product of claim 11 and
  (b) an isocyanate-reactive comonent.

14. The composition of claim 13 wherein component (b) is a polyol.

* * * * *